United States Patent
Cheng

(10) Patent No.: US 11,808,953 B2
(45) Date of Patent: Nov. 7, 2023

(54) MICROLENS ARRAY DEVICE USED TO PROJECT AT LEAST TWO PATTERNS FOR IMPROVING CONTROL OF PROJECTING LIGHT

(71) Applicant: HIMAX TECHNOLOGIES LIMITED, Tainan (TW)

(72) Inventor: Yu-Ching Cheng, Tainan (TW)

(73) Assignee: HIMAX TECHNOLOGIES LIMITED, Tainan (TW)

(*) Notice: Subject to any disclaimer, the term of this patent is extended or adjusted under 35 U.S.C. 154(b) by 299 days.

(21) Appl. No.: 17/080,864

(22) Filed: Oct. 27, 2020

(65) Prior Publication Data

US 2022/0128741 A1    Apr. 28, 2022

(51) Int. Cl.
*G02B 3/00* (2006.01)
*G02B 1/11* (2015.01)
*G02B 3/04* (2006.01)
*G01S 7/481* (2006.01)

(52) U.S. Cl.
CPC .............. *G02B 3/0081* (2013.01); *G02B 1/11* (2013.01); *G02B 3/0056* (2013.01); *G02B 3/04* (2013.01); *G01S 7/481* (2013.01)

(58) Field of Classification Search
CPC ...... G02B 3/0081; G02B 3/0056; G02B 3/04; G02B 1/11; G01S 7/481
USPC .......................................................... 359/619
See application file for complete search history.

(56) References Cited

U.S. PATENT DOCUMENTS

| | | | |
|---|---|---|---|
| 2008/0117519 A1* | 5/2008 | Chari | B29C 33/3842 |
| | | | 359/619 |
| 2012/0051044 A1* | 3/2012 | Akiyama | G03B 21/2033 |
| | | | 362/233 |
| 2017/0115489 A1* | 4/2017 | Hu | G06T 19/006 |
| 2018/0149775 A1 | 5/2018 | Power | |
| 2022/0103741 A1* | 3/2022 | Lee | G06V 10/143 |

FOREIGN PATENT DOCUMENTS

| | | |
|---|---|---|
| CN | 107614281 A | 1/2018 |
| CN | 108627982 A | 10/2018 |
| CN | 111198409 A | 5/2020 |
| CN | 211236319 U | 8/2020 |
| KR | 10-1826962 | 2/2018 |
| KR | 10-2019-0095855 | 8/2019 |
| TW | 201612853 A | 4/2016 |
| TW | 201739131 A | 11/2017 |

* cited by examiner

*Primary Examiner* — Wyatt A Stoffa
*Assistant Examiner* — Mitchell T Oestreich
(74) *Attorney, Agent, or Firm* — Winston Hsu

(57) ABSTRACT

A microlens array device includes a substrate and a microlens array. The microlens array is disposed on the substrate and includes a plurality of first lenses and a plurality of second lenses. Each of the first lenses is used to project a first pattern on a far field. Each of the second lenses is used to project a second pattern on the far field. The first pattern has a first area on the far field. The second pattern has a second area on the far field. The first area is different from the second area. One of the two patterns is completely overlapped on the other one of the two patterns.

12 Claims, 5 Drawing Sheets

MICROLENS ARRAY DEVICE USED TO PROJECT AT LEAST TWO PATTERNS FOR IMPROVING CONTROL OF PROJECTING LIGHT

BACKGROUND OF THE INVENTION

1. Field of the Invention

The application is related to a microlens array device, and more particularly, a microlens array device used to project at least two patterns for improving the control of projecting light.

2. Description of the Prior Art

In many applications such as time-of-flight and three dimensional (3D) sensing system which requires controlled illumination of the scene, microlens arrays (MLAs) can be used to generate required light patterns. A common regular microlens array can efficiently provide a symmetric light pattern such as a rectangular or a hexagonal pattern, and the symmetric light pattern often has a simple light intensity distribution.

However, it is difficult to use a common regular microlens array to generate a light pattern with more complex light intensity distributions such as a distribution of geometric superposition patterns and an asymmetric distribution.

In the field, there is a lack of proper solution for providing light patterns with more complex distributions, and this leads to difficulties in more advanced applications.

SUMMARY OF THE INVENTION

An embodiment provides a microlens array device including a substrate and a microlens array. The microlens array is disposed on the substrate and includes a plurality of first lenses and a plurality of second lenses. Each of the first lenses is used to project a first pattern on a far field. Each of the second lenses is used to project a second pattern on the far field. The first pattern has a first area on the far field. The second pattern has a second area on the far field. The first area is different from the second area. One of the two patterns is completely overlapped on the other one of the two patterns.

These and other objectives of the present invention will no doubt become obvious to those of ordinary skill in the art after reading the following detailed description of the preferred embodiment that is illustrated in the various figures and drawings.

DETAILED DESCRIPTION

In order to generate light patterns with more complex light distributions for more applications, a microlens array device is proposed according to embodiments. The drawings described in the text are merely examples for explaining embodiments instead of limiting embodiment.

Figure 1:
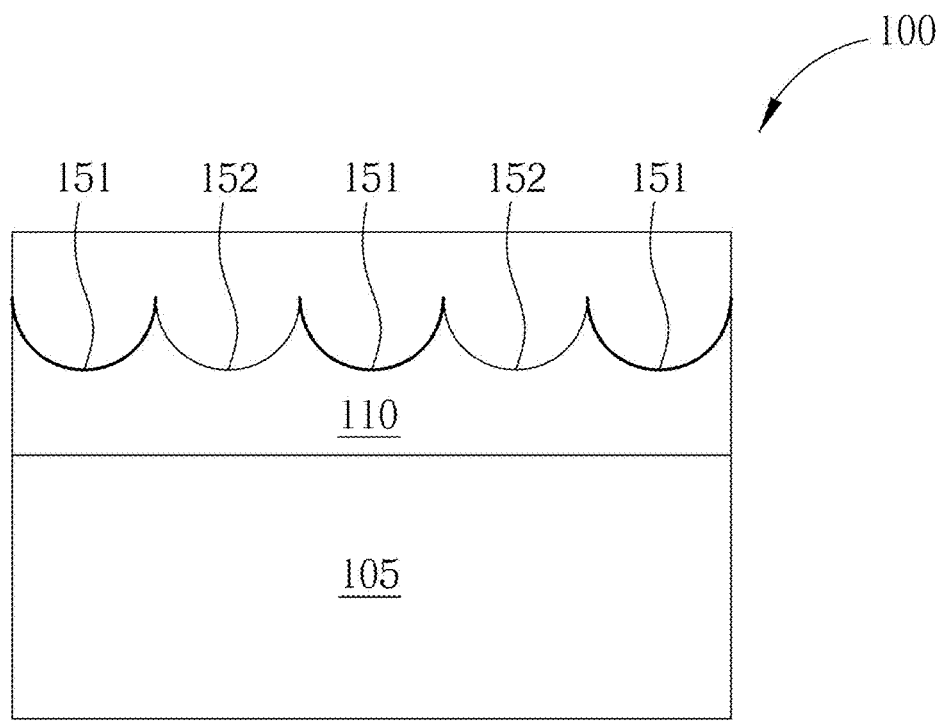
FIG. 1 illustrates a side view of a microlens array device according to an embodiment.
Figure 2:
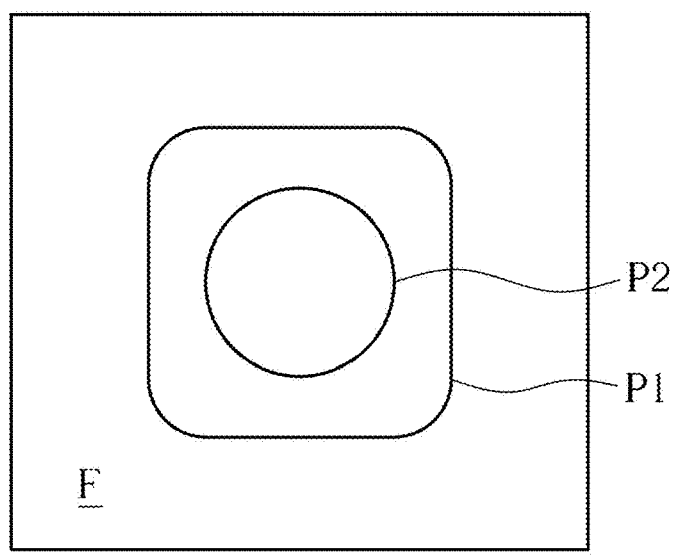
FIG. 2 illustrates a first pattern and a second pattern projected on a far field using the microlens array device of FIG. 1.

FIG. 1 illustrates a side view of a microlens array device 100 according to an embodiment. FIG. 2 illustrates a first pattern P1 and a second pattern P2 projected on a far field F using the microlens array device 100 of FIG. 1.

As shown in FIG. 1, the microlens array device 100 may include a substrate 105 and a microlens array 110. The microlens array device 110 may be disposed on the substrate 105 and includes a plurality of first lenses 151 and a plurality of second lenses 152. Each of the first lenses 151 may be used to project the first pattern P1 on the far field F. Each of the second lenses 152 may be used to project the second pattern P2 on the far field F.

The first pattern P1 has a first area on the far field F, and the second pattern P2 has a second area on the far field F. The first area is different from the second area; for example, as shown in FIG. 2, the first area of the first pattern P1 is larger than the second area of the second pattern P2. One of the two patterns P1 and P2 may be completely overlapped on the other one of the two patterns P1 and P2. For example, as shown in FIG. 2, the second pattern P2 is completely overlapped on the first pattern P1. The patterns P1 and P2 may be scattered on the far field F. The shapes of the patterns P1 and P2 may be substantially identical or different.

In FIG. 1 and FIG. 2, two kinds of lenses (i.e. the lenses 151 and 152) are used to generate two patterns P1 and P2, and the patterns P1 and P2 form a pattern with more complex light distribution. However, FIG. 1 and FIG. 2 merely provide an example for describing the principle of embodiments. Depending on the required pattern, a plurality of third lenses or more kind of lenses can be used in addition to the lenses 151 and 152. By means of microlens array including at least two different kinds of lenses, two or more patterns can be generated, and the generated patterns can further form a light pattern with more complex light distribution so as to support more sophisticated and advanced applications. FIG. 2 is merely a conceptual diagram, and more detailed diagrams are provided as examples in the following.

Regarding FIG. 1 and FIG. 2, the number of first lenses 151 may be corresponding to a first light intensity of the first pattern P1, and the number of second lenses 152 may be corresponding to a second light intensity of the second pattern P2. For example, if the number of first lenses 151 is N1, and the number of second lenses 152 is N2, the difference and contrast between the light intensities of the patterns P1 and P2 can be controlled by controlling the ratio N1/N2.

The number of the first lenses and the number of the second lenses may be with different ratio. In other words, the number N1, the number N2 and the ratio N1/N2 mentioned above may be adjusted according to requirements.

According to an embodiment, the first lenses 151 and the second lenses 152 may be of the same surface type. According to another embodiment, each of the first lenses 151 and each of the second lenses 152 may be of different lens profiles, different surface types, and/or different pitches.

According to an embodiment, the first lenses 151 and the second lenses 152 may be randomly arranged on the substrate 105. After observing the projected patterns P1 and P2 on the far field F, the arrangement of the lenses 151 and 152 on the substrate 105 can be adjusted so as to improve the patterns P1 and P2.

Figure 3:
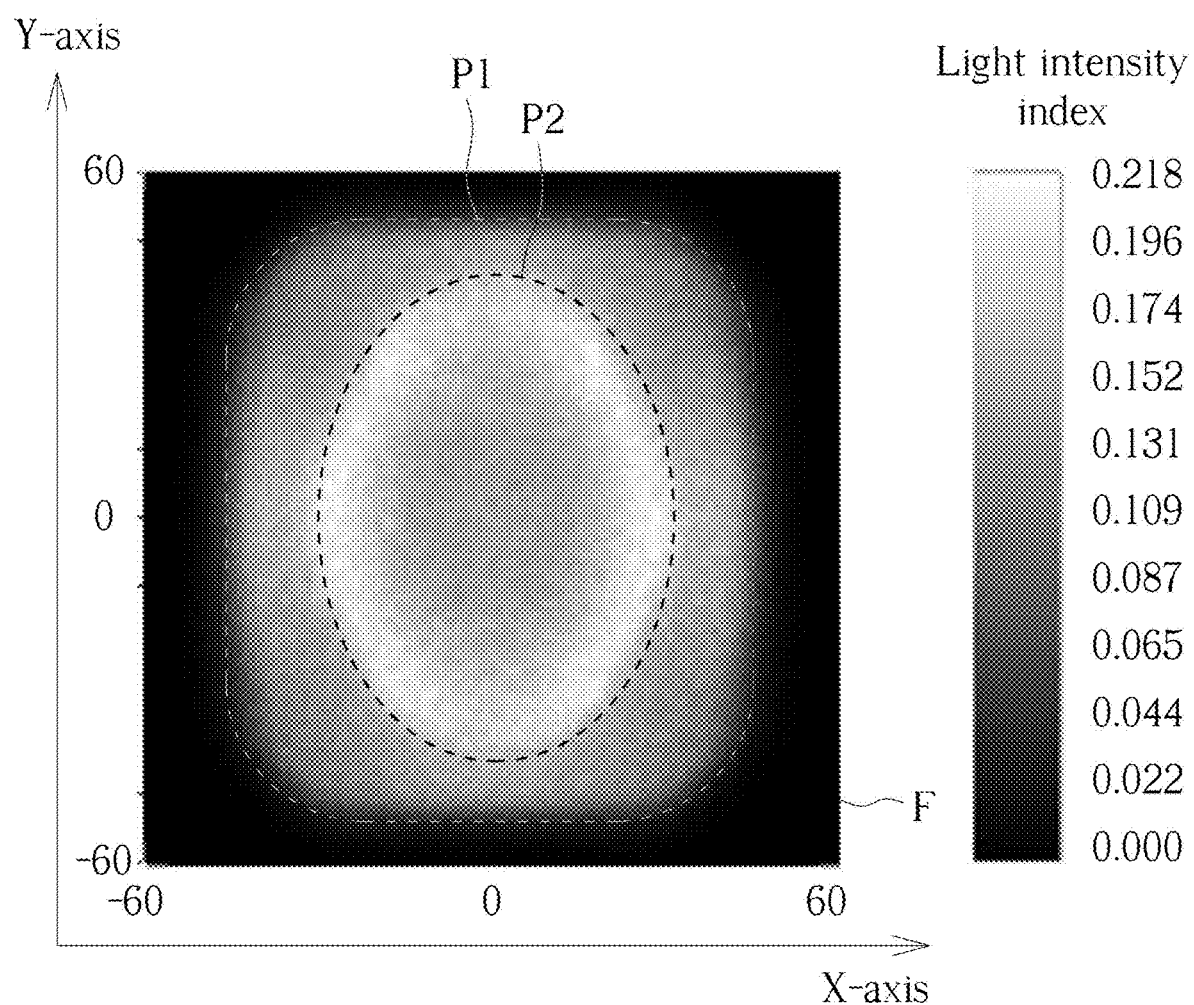
FIGS. 3-5 illustrate the patterns projected on the far field according to different embodiments.

FIG. 3 illustrates the pattern P1 and the pattern P2 projected on the far field F according to an embodiment. In FIG. 3, the X-axis and the Y-axis are respectively a horizontal axis and a vertical axis. The light intensity index can be as shown on the right. The unit of numbers on the X-axis and the Y-axis may be a predetermined or normalized angle unit such as degree. The unit of numbers on the light intensity index may be a predetermined or normalized intensity unit. The densities shown in the light intensity index may be corresponding to the densities shown in the patterns on the left. The light intensity index indicates different light (radiation) intensities.

As shown in FIG. 3, the pattern P1 may have an approximately rectangular shape. For example, the shape of the pattern P1 may be similar to a rectangle with rounded corners. As shown in FIG. 3, the pattern P2 may have a ring shape. As shown in FIG. 3, the variation of light intensity inside the pattern P1 may not be significant. Regarding the pattern P2 shown in FIG. 3, because the light intensity on the edge of the pattern P2 is greater than the light intensity inside the pattern P2, the pattern P2 may reveal a ring shape with a more significant light intensity. With the relatively uniform intensity distribution of the pattern P1 and significant intensity of the pattern P2, an approximately rectangular pattern with an interior ring shape can be achieved.

According to embodiments, a lens profile of each of the lenses 151 and each of the lenses 152 can be adjusted to adjust the light variation between an edge and an interior of the pattern projected on the far field. For example, when the lens profile corresponds to a deeper and steeper lens shape, the light contrast between the edge and the interior of the projected pattern may be higher; in other words, the brightness and the darkness of the pattern will be more distinct. In another case, when the lens profile corresponds to a shallower and more gentle-sloped lens shape, the light contrast between the edge and the interior of the projected pattern may be lower; in other words, the brightness and the darkness of the pattern will be less distinct. By adjusting the lens profile(s) of the lenses, different patterns may be generated as shown in FIG. 4 and FIG. 5 described below.

Figure 4:
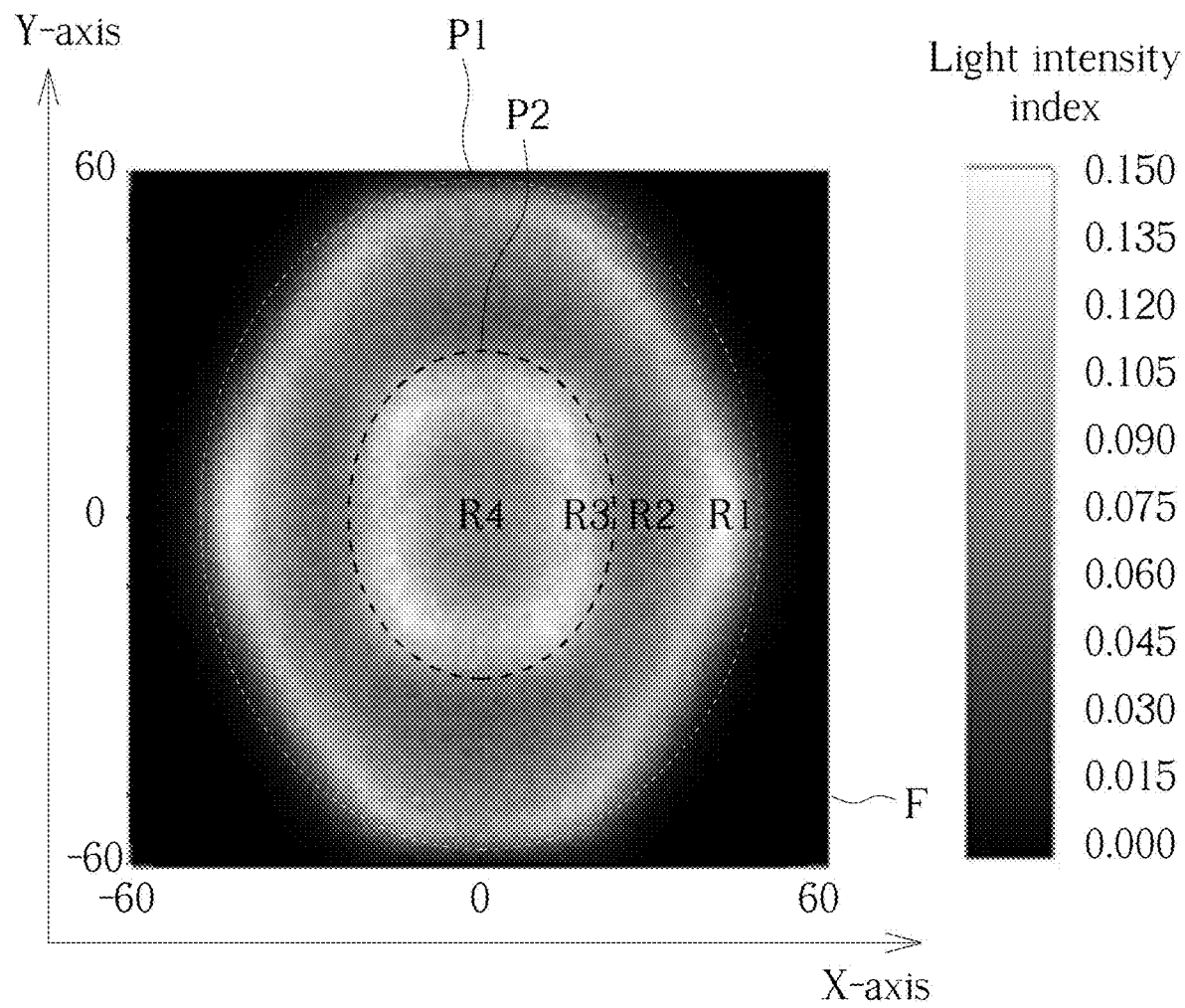

FIG. 4 illustrates the pattern P1 and the pattern P2 projected on the far field F according to another embodiment. The similarities of FIG. 3 and FIG. 4 are not repeatedly described. In FIG. 4, the pattern P1 may have a ring shape, and the pattern P2 may have a substantially rectangular shape; however, this is merely an example instead of limiting embodiments. Compared with FIG. 3, the light contrast between the edge and the interior of each of the patterns P1 and P2 in FIG. 4 may be greater.

As shown in FIG. 4, the pattern formed with the patterns P1 and P2 may be roughly divided into regions R1, R2, R3 and R4. The region R1 corresponds to the edge of the pattern P1. The region R2 is between the edges of the patterns P1 and P2. The region R3 corresponds to the edge of the pattern P2. The region R4 corresponds to the interior of the pattern P2. As shown in FIG. 4, regarding the light intensity, the regions R1, R2, R3 and R4 may be brighter, darker, brighter and darker because the light contrast between the edge and the interior of each of the patterns P1 and P2 of FIG. 4 may be greater as described above. If the brighter regions R1 and R3 are regarded as two "sub-patterns", the sub-patterns shown in FIG. 4 may be nearly unconnected to one another since the region R2 is darker.

Figure 5:
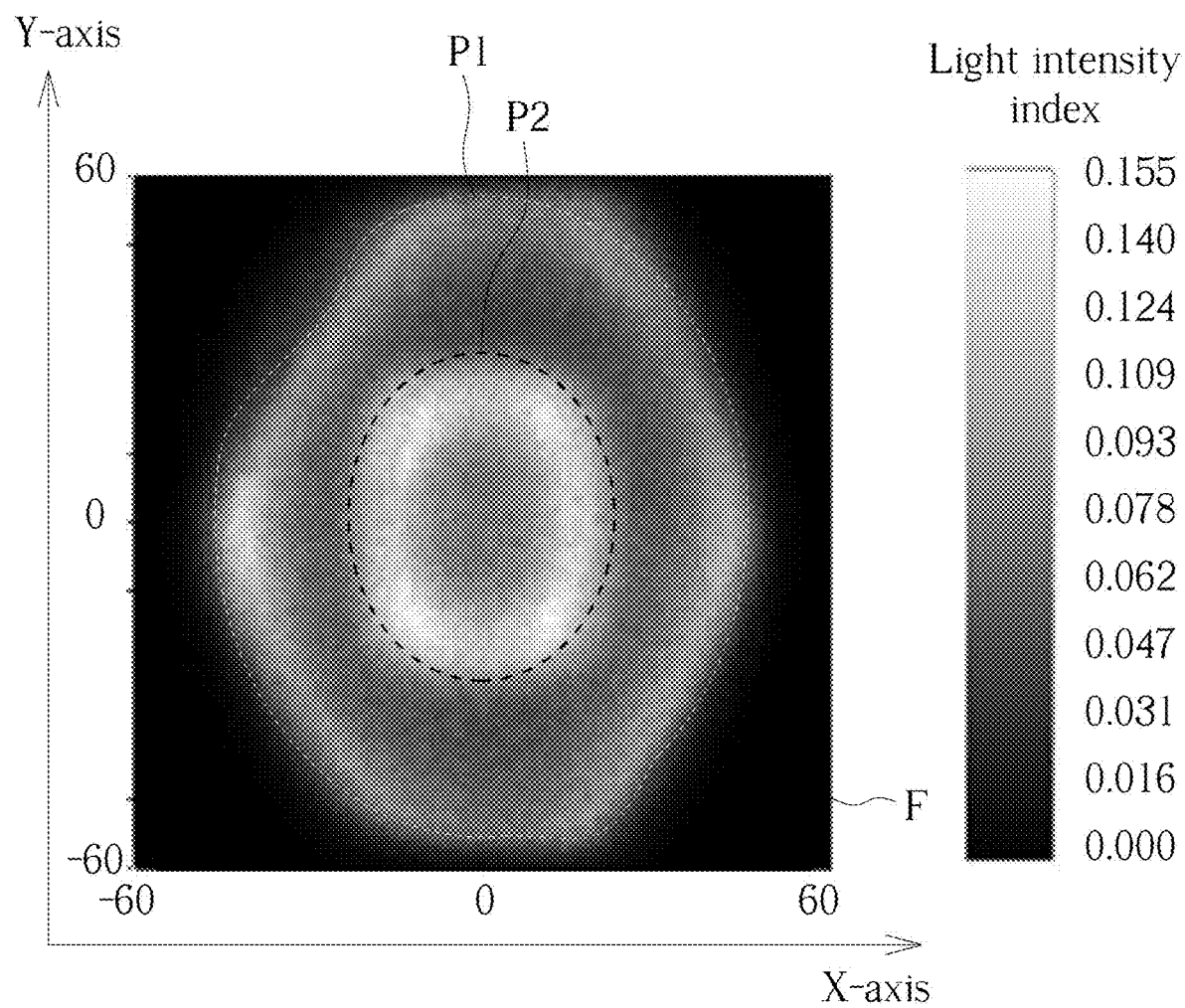

FIG. 5 illustrates the pattern P1 and the pattern P2 projected on the far field F according to another embodiment. FIG. 5 may be similar to FIG. 4, and the similarities are not repeatedly described. However, the pattern P1 of FIG. 5 may have an asymmetric shape. Regarding FIG. 1 and FIG. 5, each of the lenses 151 and 152 may be of a freeform surface type to project an asymmetric shape. In addition, each of the lenses 151 and 152 may be of an aspheric surface type to adjust the shape of the projected pattern.

As shown in FIG. 3 to FIG. 5, by means of the microlens array device 100 of FIG. 1 and adjusting the lens profile(s) of the lenses, more complex patterns can be projected for supporting more advance application.

The quality of the projected patterns can be improved according to embodiments. As mentioned in FIG. 1, there may be a plurality of lenses 151 and lenses 152. When lenses of the same profile are regularly arranged in an array, unwanted speckles will be generated on the projected pattern(s). Hence, the radius of curvature and/or the conic constant of a lens can be adjusted to reduce the speckle and improve the quality of the patterns. The adjustments of the radius of curvature and the conic constant are as follows.

Regarding the lens profile, the profile and the shape of a lens may be expressed as the equation eq-1:

$$sag=f(C,r,K) \qquad \text{eq1};$$

where f( ) may be a predetermined function, sag may be related to the degree of the curvature of a lens, C may be a curvature, r may be a distance from a position on the lens to the lens center, and K may be a conic constant. For example, C may be equal to 1/R, where R may be a radius of curvature. Here R and r mean different features related to the lens. For example, equation eq-1 may be (but not limited to) expressed as equation eq-2:

$$sag = \frac{C \times r^2}{1 + \sqrt{1-(1+K)C^2r^2}}. \qquad \text{eq-2}$$

The equation eq-2 is merely an example instead of limiting the embodiments.

For example, an ith lens 151 may have an ith radius of curvature Ri. The ith radius of curvature Ri may be generated according to a predetermined radius of curvature R and an ith adjustment radius ΔRi and be expressed as equation eq-3:

$$Ri=g(R,\Delta Ri) \qquad \text{eq-3};$$

where g( ) may be a predetermined function, i is an integer larger than zero, and the number of the lenses 151 (i.e. N1 mentioned above) is larger than or equal to i. For example, the ith radius of curvature Ri may be generated by adding the predetermined radius of curvature R and the ith adjustment radius ΔRi; in other words, equation eq-3 may be expressed as equation eq-4:

$$Ri=R+\Delta Ri \qquad \text{eq-4}.$$

The equation eq-4 is merely an example instead of limiting the embodiments.

The ith adjustment radius ΔRi may be obtained by selecting a value from a predetermined range according to a probability distribution function. For example, the predetermined radius of curvature R may be −6 micrometers (um), the predetermined range may be −0.5 um to +0.5 um, and the ith adjustment radius ΔRi may be selected from the predetermined range (i.e. −0.5 um to +0.5 um). For example, the said probability distribution function may be a uniform distribution function, a normal distribution function or an appropriate distribution function. According to embodiments, the ith adjustment radius Ri may be obtained by randomly selecting a value from the predetermined range.

Regarding the conic constant K, the conic constant K of each lens can be adjusted to reduce unwanted speckles on the projected pattern. For example, an ith lens 151 may have an ith conic constant Ki. The ith conic constant Ki may be generated according to a predetermined conic constant K and an ith adjustment constant ΔKi and be expressed as equation eq-5:

$$Ki=h(K,\Delta Ki) \quad \text{eq-5;}$$

where h( ) is a predetermined function, i is an integer larger than zero, and the number of the lenses 151 (i.e. N1 mentioned above) is larger than or equal to i. For example, the ith conic constant Ki may be generated by adding the predetermined conic constant K and the ith adjustment constant ΔKi; in other words, equation eq-3 may be expressed as equation eq-6:

$$Ki=K+\Delta Ki \quad \text{eq-6.}$$

The equation eq-6 is merely an example instead of limiting the embodiments.

The ith adjustment constant ΔKi may be obtained by selecting a value from a predetermined range according to a probability distribution function. For example, the probability distribution function may be a uniform distribution function, a normal distribution function or an appropriate distribution function. According to embodiments, the ith adjustment constant ΔKi may be obtained by randomly selecting a value from a predetermined range.

The ith lens 151 is mentioned above as an example; likewise, each of the lenses 152 may have a radius of curvature and a conic constant; where the radius of curvature may be generated according to a predetermined radius and an adjustment radius, and the conic constant may be generated according to a predetermined conic constant and an adjustment constant in order to reduce the speckles.

Figure 6:
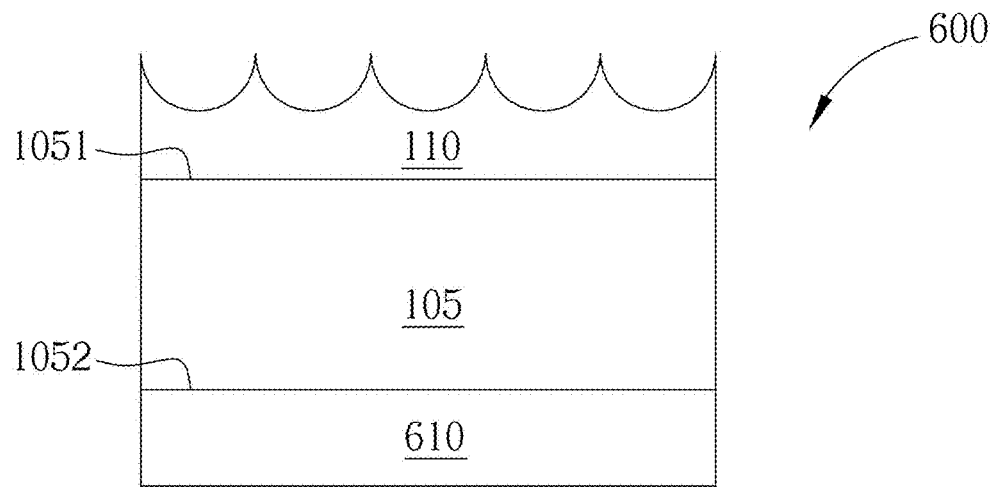
FIG. 6 illustrates a side view of a microlens array device according to another embodiment.

FIG. 6 illustrates a side view of a microlens array device 600 according to another embodiment. Compared with the microlens array device 100 of FIG. 1, the microlens array device 600 may further have an anti-reflective (AR) coating layer 610 used to reduce reflection and enhance transmittance. As shown in FIG. 6, the substrate 105 may have a first side 1051 and a second side 1502. The microlens array 110 may be disposed on the first side 1051. The anti-reflective coating layer 610 may be disposed on the second side 1052.

Figure 7:
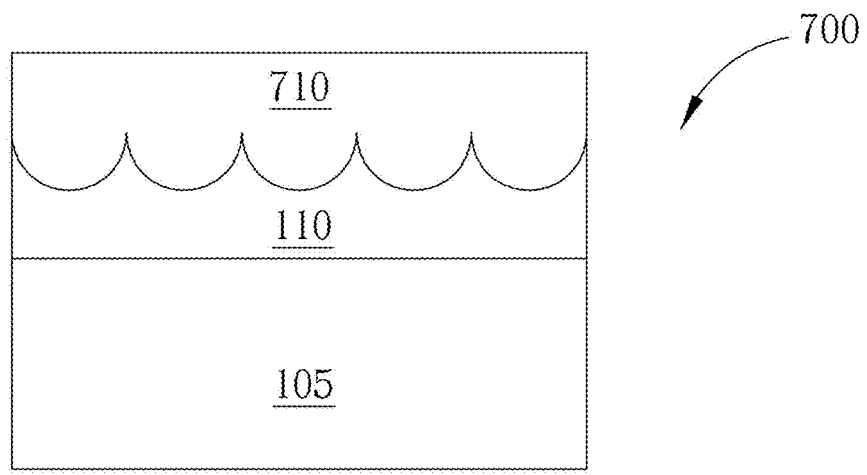
FIG. 7 illustrates a side view of a microlens array device according to another embodiment.

FIG. 7 illustrates a side view of a microlens array device 700 according to another embodiment. As shown in FIG. 7, an anti-reflective coating layer 710 may be disposed on the microlens array 110 and used to reduce reflection and enhance transmittance. The microlens array 110 may be between the anti-reflective coating layer 710 and the substrate 105.

According to another embodiment, the anti-reflective coating layers 610 in FIGS. 6 and 710 in FIG. 7 may be both applied.

Figure 8:
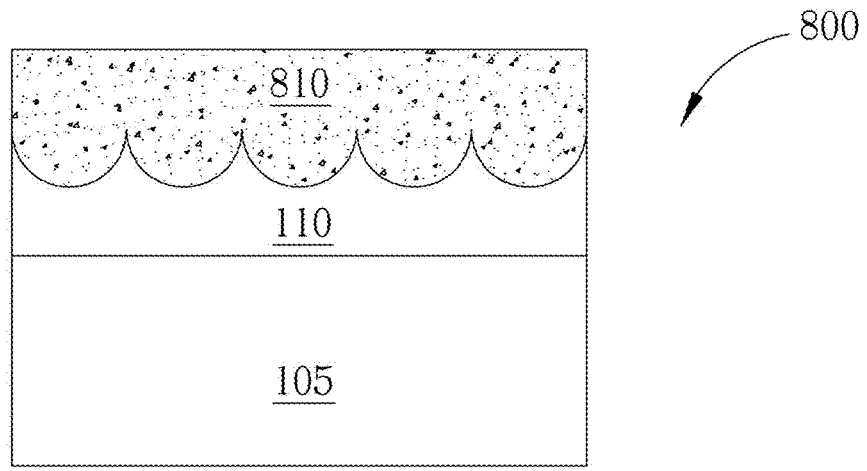
FIG. 8 illustrates a side view of a microlens array device according to another embodiment.

FIG. 8 illustrates a side view of a microlens array device 800 according to another embodiment. As shown in FIG. 8, an index matching (IM) layer 810 may be disposed on the microlens array 110 and used to protect the microlens array 110. The microlens array 110 may be between the index matching layer 810 and the substrate 105. An external element may be optionally placed on the index matching layer 810 if needed.

In summary, by means of the microlens array device of embodiments, specific light patterns with more complex light intensity distribution(s) and shape(s) can be projected on a far field. In other words, the control of projecting light can be improved. For example, advanced applications related to laser homogenization, time-of-flight and three dimensional sensing system and so on can be better supported. According to embodiments, the unwanted speckles can be reduced by adjusting the lens profile(s), and the quality of the projected patterns can be improved. Hence, solutions for resolving problems in the field are provided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A microlens array device comprising:
   a substrate;
   a microlens array disposed on the substrate, comprising:
   a plurality of first lenses each configured to project a first pattern on a far field; and
   a plurality of second lenses each configured to project a second pattern on the far field;
   wherein the plurality of first lenses and the plurality of second lenses are arranged in an alternate manner, the first pattern has a first area on the far field, the second pattern has a second area on the far field, the first area is different from the second area, and one of the two patterns is completely overlapped on another one of the two patterns.

2. The microlens array device of claim 1, wherein the first pattern has an approximately rectangular shape.

3. The microlens array device of claim 1, wherein the second pattern has a ring shape.

4. The microlens array device of claim 1, wherein a number of the first lenses is corresponding to a first light intensity of the first pattern, and a number of the second lenses is corresponding to a second light intensity of the second pattern.

5. The microlens array device of claim 1, wherein:
   an ith first lens has an ith radius of curvature, the ith radius of curvature is generated according to a predetermined radius of curvature and an ith adjustment radius, i>0, and i is an integer;
   the ith radius of curvature is generated by adding the predetermined radius of curvature and the ith adjustment radius; and
   the ith adjustment radius is obtained by selecting a value from a predetermined range according to a probability distribution function, and the probability distribution function is one of a uniform distribution function and a normal distribution function.

6. The microlens array device of claim 1, wherein:
   an ith first lens has an ith conic constant, the ith conic constant is generated according to a predetermined conic constant and an ith adjustment constant, i>0, and i is an integer;
   the ith conic constant is generated by adding the predetermined conic constant and the ith adjustment constant; and
   the ith adjustment constant is obtained by selecting a value from a predetermined range according to a probability distribution function, and the probability distribution function is one of a uniform distribution function and a normal distribution function.

7. The microlens array device of claim 1, wherein each of the first lenses is of a freeform surface type, and the first pattern has an asymmetric shape.

8. The microlens array device of claim 1, wherein each of the first lenses is of an aspheric surface type.

9. The microlens array device of claim 1, wherein the substrate has a first side and a second side, the microlens array is disposed on the first side of the substrate, and the microlens array device further comprises:
an anti-reflective coating layer disposed on the second side of the substrate and configured to reduce reflection and enhance transmittance.

10. The microlens array device of claim 1, further comprising an anti-reflective coating layer disposed on the microlens array and configured to reduce reflection and enhance transmittance, wherein the microlens array is between the anti-reflective coating layer and the substrate.

11. The microlens array device of claim 1, further comprising an index matching layer disposed on the microlens array and configured to protect the microlens array, wherein the microlens array is between the index matching layer and the substrate.

12. The microlens array device of claim 1, wherein each of the first lenses and each of the second lenses are of different lens profiles, different surface types, and/or different pitches.

* * * * *